J. A. ANGLADA.
VEHICLE WHEEL RIM.
APPLICATION FILED JUNE 4, 1910.
1,095,771. Patented May 5, 1914.
2 SHEETS—SHEET 1.
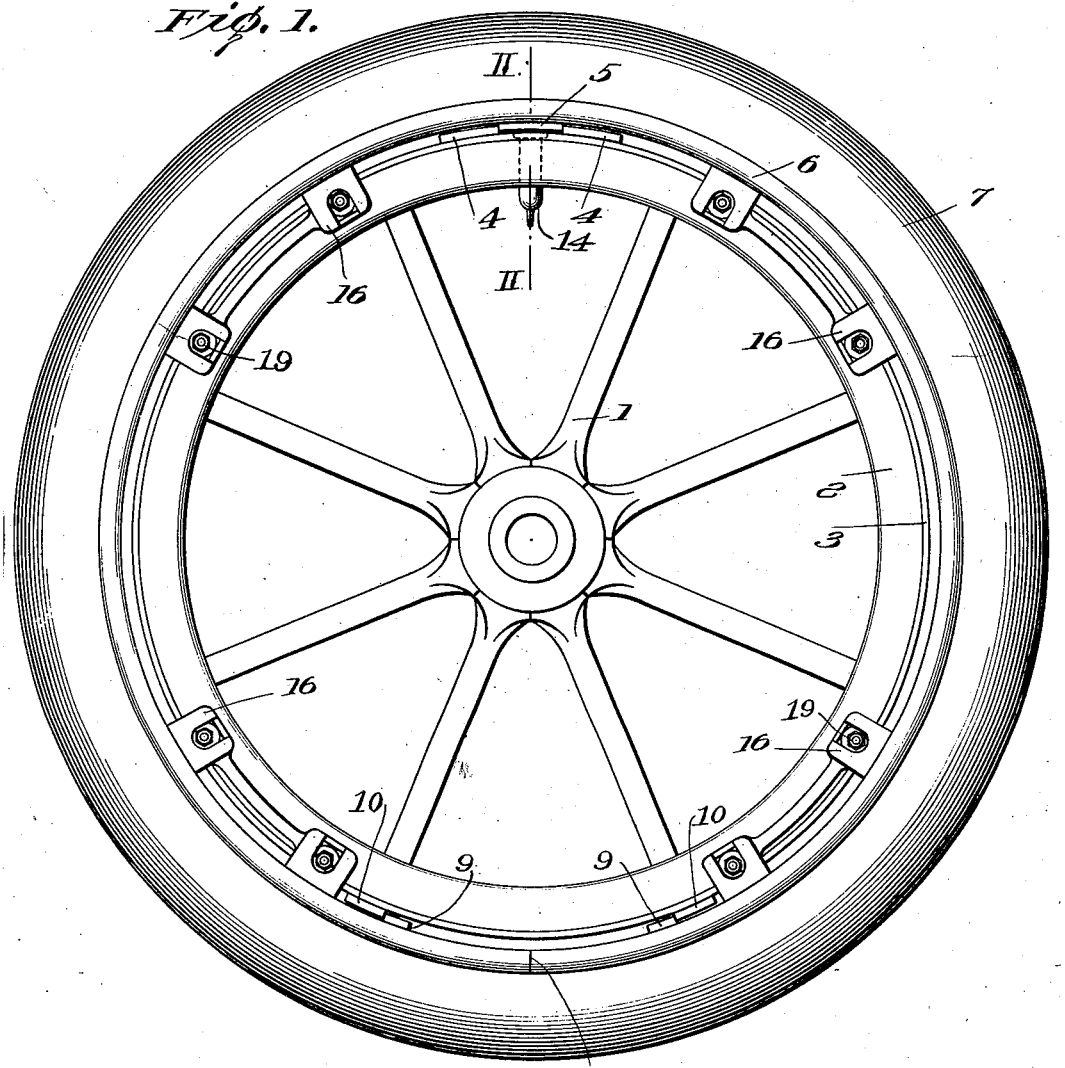
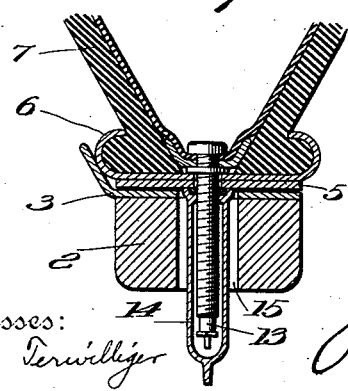
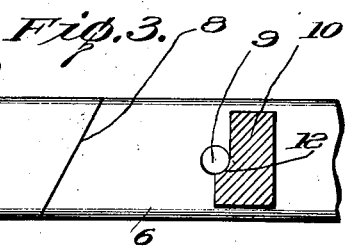
Witnesses:
Gerald E. Terwilliger
Edmund Quincy Moses
Joseph A. Anglada, Inventor
By his Attorney Seward Davis J. A. ANGLADA.
VEHICLE WHEEL RIM.
APPLICATION FILED JUNE 4, 1910.
1,095,771.
Patented May 5, 1914.
2 SHEETS—SHEET 2.
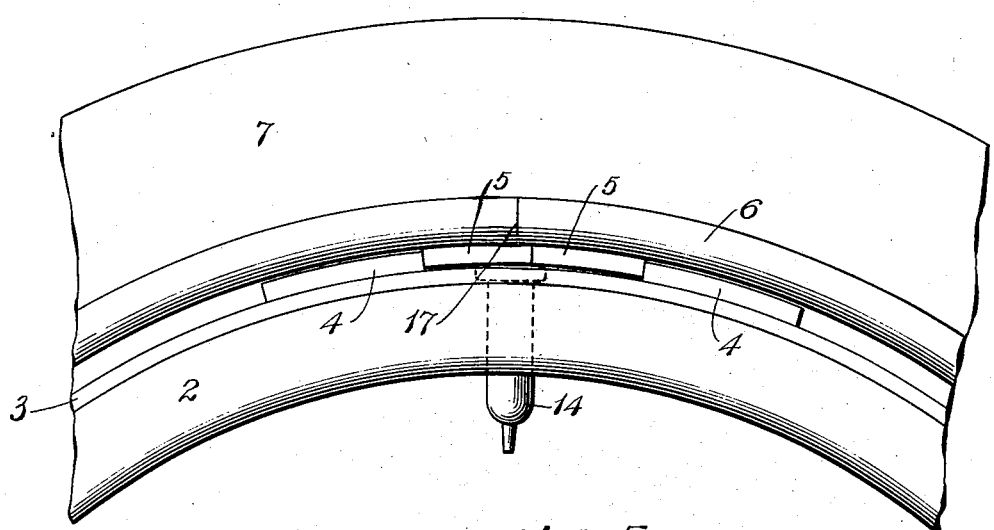
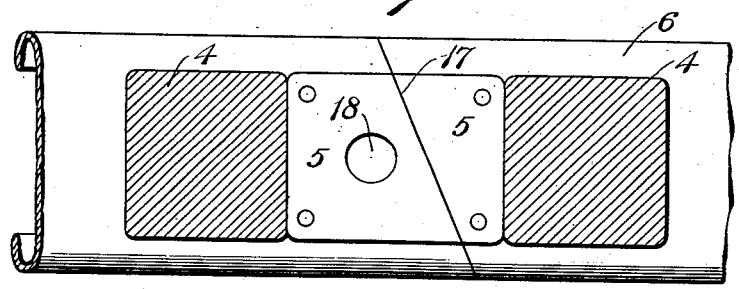
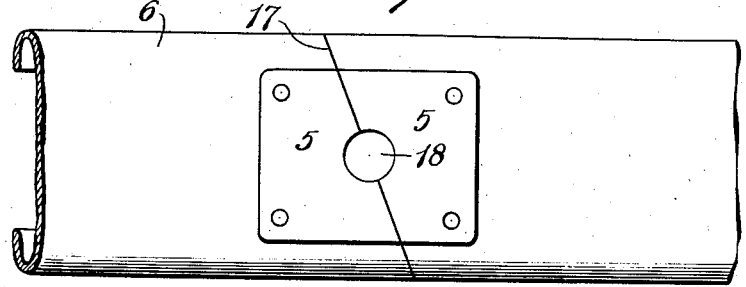
WITNESSES
Olive Williams
Gerald E. Terwilliger
INVENTOR
Joseph A. Anglada
BY
Seward Davis
ATTORNEY

UNITED STATES PATENT OFFICE.

JOSEPH A. ANGLADA, OF NEW YORK, N. Y., ASSIGNOR, BY MESNE ASSIGNMENTS, TO UNIVERSAL RIM COMPANY, OF CHICAGO, ILLINOIS, A CORPORATION OF ILLINOIS.

VEHICLE WHEEL-RIM.

1,095,771.      Specification of Letters Patent.      Patented May 5, 1914.

Application filed June 4, 1910. Serial No. 564,940.

*To all whom it may concern:*

Be it known that I, JOSEPH A. ANGLADA, a citizen of the United States, residing in the city, county, and State of New York, have invented certain new and useful Improvements in Vehicle Wheel-Rims, of which the following is a specification.

My invention relates to improvements in vehicle wheel rims of the transversely split type, for use with pneumatic or other resilient tires, and has for its object the provision of a novel tire-carrying rim and means for separably mounting it upon the felly of the wheel, and for disengagement from the tire, the rim and its tire being capable of removal from the wheel without the deflation of the tire. It also provides novel means for positioning the rim by uniting and alining its split ends when in service, and also for excluding dirt and moisture at the point where they are most likely to enter the tire casing of tires carried by demountable rims of the wedge fastening type, namely, at the point where the valve stem passes through the rim and felly.

Other objects of my invention embodying novel features of structural advantage are also present, as will appear from the following description.

In the accompanying drawings, which form a part of this specification, Figure 1 is an elevation of a vehicle wheel equipped with my device; Fig. 2 is a sectional view on line II—II of Fig. 1; Fig. 3 is a view of the transversely split rim looking downwardly, the uniting and alining means carried by the felly being shown in section; Fig. 4 is a fragmentary side elevation of a modification in which the tire-carrying rim is transversely split through the driving lug; Fig. 5 is a view of the rim with this modification, looking upward, *i. e.* radially outward, and Fig. 6 is a similar view in which the rim is transversely split through the driving lug, in a line passing through the hole therein.

Referring to the drawings in detail, the numeral 1 designates a vehicle wheel having the felly 2, to which is rigidly fastened the felly band 3 carrying the driving plates 4, 4 which engage the driving lug 5 carried by the removable rim 6 on which is supported the tire 7. The rim is split transversely at 8, preferably on a diagonal line and preferably at a point opposite the valve hole 18, therethrough, as shown in Fig. 3. The rim carries on either side of the split the pins 9 which engage the alining and uniting lugs 10 on the felly band. These lugs are cut away at 11, having a rounded face 12, so that when the tire carrying rim is forced home by the wedges securing it to the felly, the pins will be driven against the alining and uniting lugs and will be seated against their curved faces, providing for the alining and uniting of the ends of the split rim.

In my preferred form of construction for preventing the entrance of foreign substances into the tire by the hole 15 in the felly, or by the hole in the driving lug, through which the valve stem 13 passes, I make use of a valve stem cap 14 passing completely through the felly and felly band, and adapted to seat against the driving lug, the hole in the felly being made sufficiently large to permit of the removal of the tire-carrying rim and tire in the usual manner. Wedge members 16 are provided for clamping the tire-carrying rim to the felly band of the wheel, and bolts and nuts 19 are provided for locking these wedges in position.

In that form of my invention illustrated in Figs. 4, 5 and 6, the rim and driving lug are split along the diagonal line 17. This split preferably passes to one side of the valve stem hole in the driving lug, but may pass through the hole, as shown in Fig. 6, which construction has in some cases certain advantages.

The operation of my device is as follows: The loosening of the nuts 19 permits the withdrawal of the wedges, thus allowing the removal as a unit of the tire and tire-carrying rim in the usual manner of demountable rims. In order most readily to accomplish this, the portion of the tire-carrying rim opposite the valve stem is first moved laterally out of engagement with the felly band, and the pins carried thereby, and the rim and tire are then lifted upwardly as a unit from the wheel, the valve cap being withdrawn upwardly through the felly. The removal of the pins from engagement with the lugs, in the type shown in Fig. 3, or of the split driving lug from the driving plates in Figs. 4 and 5, followed by removal from the wheel, frees the ends of the rim and permits the tire-carrying rim to be telescoped at the point where it is split, the overlapping of the ends thus obtained causing a decrease in diameter sufficient to permit the tire to be readily removed from the rim, whether the tire is of the extensible or inextensible bead type. To mount the tire-carrying rim in place on the felly, the rim is first placed thereon with its driving lug or part between the driving projections on the wheel felly and then the wedge members are inserted and forced home, a longitudinal stress being thereby imparted to the rim which serves to lock the uniting means firmly in position. The alining of the ends of the plit rim is further accomplished by cutting the rim on a transversely diagonal line, as shown, since the inclined surfaces at the split in the rim will slide on each other until proper alinement is obtained, when the rim is seated in place by the wedges.

My invention is susceptible of various embodiments in structural modification of the elements illustrated.

Having thus described and illustrated my invention, I claim:

1. In combination, in a vehicle wheel, a transversely split tire-carrying rim, a wheel member, means for uniting and alining the ends of said rim including projections on each side of the split in said rim engaging lugs on said fixed wheel member, and means for detachably securing said rim to said wheel member acting positively to stress said rim and thereby lock said uniting means.

2. In combination, in a vehicle wheel, a wheel member, a tire-carrying rim split transversely on a plane oblique to the major plane of the wheel, means for uniting the ends of said tire-carrying member including projections on one of said members engaging positioning means on the other, and means for detachably securing said tire-carrying member to said wheel member acting positively to stress said tire-carrying member and thereby lock said uniting means.

3. In combination, in a vehicle wheel, a tire-carrying rim split transversely on a plane oblique to the major plane of the wheel and including a radius, means for uniting and alining the ends of said rim including projections on each side of the split in said rim engaging lugs on said fixed wheel member, and means for detachably securing said rim to said wheel member acting positively to stress said rim and thereby lock said uniting means.

4. A vehicle wheel felly having spaced driving projections on its band, in combination with a flanged tire-carrying rim loosely fitted to said band, a driving lug on the inner periphery of said rim and fitting between said projections, said rim and lug being transversely split, wedge members spaced upon said felly, between the same and said rim, and means for tightening said wedge members, for the purpose described.

5. A vehicle wheel felly having spaced driving projections on its band, in combination with a flanged tire-carrying rim loosely fitted to said band, a driving lug on the inner periphery of said rim and fitting between said projections, said rim and lug being transversely split, one end of said rim and one part of said lug containing a valve stem hole, wedge members spaced upon said felly, between the same and said rim, and means for tightening said wedge members, for the purpose described.

6. A transversely split integrally flanged tire-carrying demountable rim, in combination with a two-part driving lug fixed on the inner periphery of the rim, the parts thereof being in abutment at the split in the rim, for the purpose described.

7. A tire-carrying demountable rim transversely split at one point in its circumference, in combination with driving parts fixed in abutting relation upon respective ends of the rim, for the purpose described.

8. A transversely split tire-carrying demountable rim, in combination with a two-part driving lug fixed on the inner periphery of the rim, the parts of said lug being in abutting relation at the split of the rim and one said part and rim end containing a valve stem hole, for the purpose described.

9. A transversely split tire-carrying demountable rim, in combination with a driving lug fixed upon the inner periphery of said rim, said rim and lug containing a valve stem hole and said rim and lug being transversely split, for the purposes described.

10. An integrally flanged tire-carrying demountable rim transversely and diagonally split at one point in its circumference, in combination with a two-part driving lug fixed on the inner periphery of said rim, the parts of said lug being in abutting relation at the split in the rim, for the purposes described.

JOSEPH A. ANGLADA.

Witnesses:
  Oliver Williams,
  Seward Davis.